Jan. 3, 1933.  W. H. DILKS  1,893,073
VALVE CYLINDER OILER
Filed Feb. 12, 1930
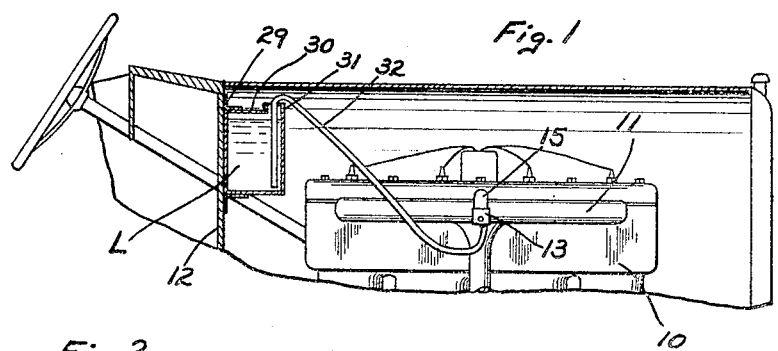
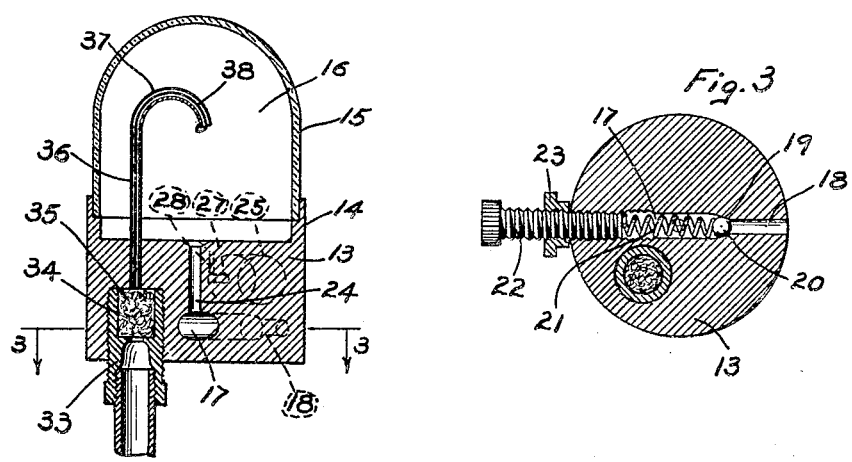
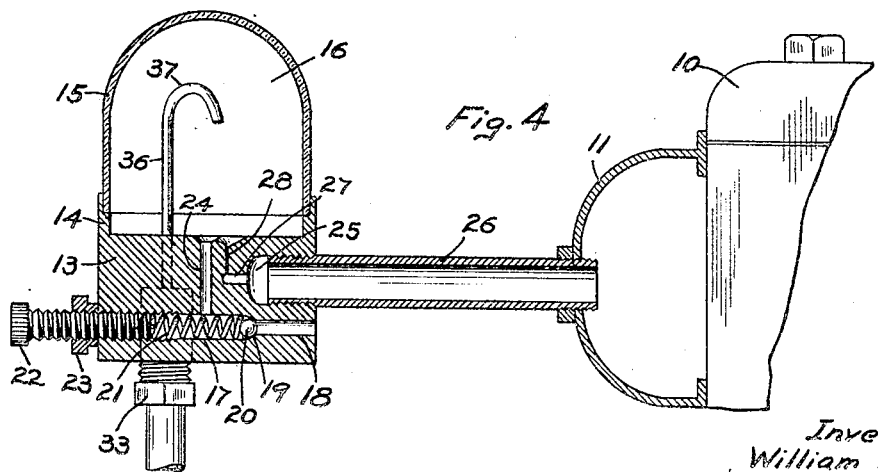
Inventor
William H. Dilks
by Hazard and Miller
Attorneys Patented Jan. 3, 1933

1,893,073

UNITED STATES PATENT OFFICE

WILLIAM H. DILKS, OF LOS ANGELES, CALIFORNIA

VALVE CYLINDER OILER

Application filed February 12, 1930. Serial No. 427,791.

This invention relates to improvements in lubricators. It is particularly designed to be used in conjunction with internal combustion engines and is adapted to supply a lubricant in such a manner that the cylinders and valves of the engine will be effectively lubricated. The invention may be considered as an improvement over the construction disclosed in an application Serial No. 275,824, filed May 7, 1928, by Harry T. Scott.

The present form of lubricator is highly advantageous in that it is of relatively small, simple and durable construction, and is designed to be supplied with lubricant from a remotely located reservoir. The arrangement is such that variations or fluctuations of the level of the lubricant in the reservoir will not affect the operation of the device in any noticeable extent. By the improved arrangement a large reservoir for lubricant can be employed, which can be suitably mounted on the dash board of an automobile, enabling a large quantity of lubricant to be carried and permitting ready replacement.

Other objects and advantages will be made manifest in the following detailed description and specifically pointed out in the appended claims, reference being had to the accompanying drawing for an illustrative embodiment of the invention, wherein:

Fig. 1 is a partial view in section illustrating the improved lubricator in applied position on an internal combustion engine of an automobile.

Fig. 2 is a vertical section through the lubricator.

Fig. 3 is a horizontal section taken substantially upon the line 3—3 upon Fig. 1.

Fig. 4 is a sectional view taken through the lubricator illustrating its being connected to the intake manifold of the internal combustion engine.

Referring to the accompanying drawing, wherein similar reference characters designate similar parts throughout, the internal combustion engine on the automobile is indicated at 10, having an intake manifold 11, and a dash board 12. The lubricator comprises a metal base 13, having an upstanding flange 14 on its top. A glass dome 15 is mounted on the flange 14 and is hermetically sealed to provide a vacuum chamber 16, the interior of which may be readily seen through the walls of the glass dome 15. In the base there is formed a diametrical bore having a large end indicated at 17 and a small end indicated at 18. These ends are defined from each other by a valve seat 19 which is adapted to have a ball valve 20 seat thereon. The ball valve is urged against the seat by a coil spring 21 compressed in the large end 17 of the bore by an adjusting screw 22. The adjusting screw is held in adjusted position by a jamb nut 23. A bore 24 connects the large end 17 of the diametrical bore with the vacuum chamber 16.

Above the small end 18 of the diametrical bore there is formed an internally threaded recess 25 which receives the threaded end of a nipple 26, which in turn is connected to the intake manifold 11. The recess 25 terminates in a small bore 27 and a vertical bore 28 extends upwardly from its inner end, communicating with the vacuum chamber 16. The vertical bore 28 is preferably quite small, being formed with a No. 70 drill. It has its upper end enlarged or coned, forming a shallow recess on the top of base 13.

On the dash board 12 suitable brackets 29 are mounted which detachably receive a container 30, constituting a reservoir for the lubricant L. The container 30 has a removable closure 31 through which a tube 32, constituting a supply pipe, extends. As clearly shown in Figure 1, the reservoir may be above the level of the lubricator and in the preferred form of construction the supply pipe extends downwardly through the cover to a point near the bottom of the reservoir. The other end of the supply pipe is provided with a connecting fitting 33 which connects it to the bottom of base 13. The upper end of the connection is internally enlarged, forming a well 34 which receives filtering material 35. A small tube 36, having a goose neck 37 formed at its top, extends downwardly through the base and communicates with the well 34. A wire 38 is positioned in the tube and the relative sizes of the tube and wire are such that the clearance between the wire and the interior of the tube is preferably ten thousandths of an inch. As clearly shown in Figure 2, this wire extends the complete length of the tube forming full restriction for the entire length of the tube.

The operation and advantages of the improved lubricator are as follows. When the internal combustion engine is running, a vacuum is formed in the intake manifold 11 and likewise a vacuum is produced in the vacuum chamber 16. The magnitude of the vacuum which is maintained in the vacuum chamber 16 can be varied by adjusting the adjusting screw 22 and thus increasing or decreasing the compression of the coil spring 21. When the difference between the atmospheric pressure and the absolute pressure within the vacuum chamber 16 is sufficient to overcome the force exerted by spring 21, air may pass around the ball valve 20 and enter the vacuum chamber. In this manner the magnitude of the vacuum within the vacuum chamber 16 can be effectively controlled.

As the vacuum chamber 16 is under a partial vacuum, lubricant will be drawn out of reservoir 30 and will pass down to the lubricator through supply pipe 32. It will then flow through the filtering material 35 and be drawn through the space between wire 38 and tube 37. The lubricant will be discharged from the end of the goose neck into the shallow cavity at the top of vertical bore 28 and from this cavity it will be drawn into the intake manifold 11. Because of the small restricted passage in tube 37, the lubricant will not siphon through the vacuum chamber 16 by its own weight but will require the assistance of the partial vacuum formed in the vacuum chamber. Consequently the improved construction enables the reservoir for lubricant to be mounted on the vehicle above the level of the lubricator. Likewise variations in the level of the lubricant within the reservoir will not affect the flow of lubricant through the vacuum chamber. It will be readily appreciated that the construction is such that as long as the engine is running there will be a constant slow flow of lubricant to the internal combustion engine which will effectively keep the cylinder walls and the valves lubricated. The operation of the device can at all times be readily seen through the walls of the dome 15.

When the supply of lubricant within the reservoir becomes exhausted, a new reservoir containing a new supply can be substituted for the old reservoir and the tube 32 withdrawn from the old reservoir and thrust through the cap of the new reservoir, it being understood that suitable vents may be formed in the cap to permit proper operation.

From the above described construction it will be appreciated that a novel, simple and advantageous lubricator for internal combustion engines is provided which is simple, cheap and durable and which may be easily installed upon an internal combustion engine without requiring modification or change of adjacent structure.

While the reservoir containing the lubricant supply is shown upon the drawing as being at a greater elevation than that of the lubricator, this is not essential. The reservoir may be located at any suitable place on the vehicle, either above or below the level of the lubricator. In some instances the supply of oil may be taken directly from the crank case, in which event tube 32 leads to the crank case. In other instances where the oil in the crank case is continually forced through a filter, tube 32 may receive its supply of oil from the tubing which returns the oil from the filter to the crank case.

When a separate reservoir, as that shown, is employed, it preferably is located at a greater elevation although this is not essential, as previously explained. By having it at a greater elevation tube 32 will at all times contain some lubricant so that this lubricant which is within tube 32 forms an instantly available supply for starting.

Various changes may be made in the details of construction without departing from the spirit or scope of the invention as defined by the appended claims.

I claim:

1. A valve and cylinder lubricator for internal combustion engines comprising a vacuum chamber adapted to be connected to the intake manifold of an internal combustion engine, a remote reservoir adapted to supply lubricant to the chamber, and a tube leading into the chamber through which the lubricant must pass, said tube having a wire positioned therein extending substantially its complete length, said wire serving to restrict the passage through the tube to such a degree as to afford a resistance to flow therethrough.

2. A valve and cylinder lubricator for internal combustion engines comprising a base, means providing a vacuum chamber on the base adapted to be connected to the intake manifold of an internal combustion engine, means for supplying a lubricant to said chamber, there being a straight bore extending diametrically through the base in which there is a valve seat, a valve for the seat, and yieldable means for holding the valve against the seat, there being a second bore connecting the vacuum chamber with the first bore behind the valve whereby the magnitude of the vacuum in the vacuum chamber may be varied.

3. A valve cylinder oiler comprising means providing a base, a dome mounted on the base providing a vacuum chamber therein, there being an outlet formed in the base leading to the intake manifold of an internal combustion engine, there being an oil inlet to the chamber terminating in such a manner as to deposit oil near the outlet, there being a diametrical bore through the base having a valve seat adjacent one end, a valve adapted to seat on the seat, a spring in the bore urging the valve to seat, and a screw threaded into the bore in the opposite end behind the spring whereby the force exerted by the spring on the valve may be varied, there being a branch bore in the base establishing communication between the chamber and said bore behind the valve whereby the valve may remain closed under small degrees of vacuum but may be opened at higher degrees of vacuum against the action of the spring to admit fresh air from outside of the device and thus reduce the high vacuums that tend to form so that the supply of oil will remain substantially constant at all speeds of the engine.

4. In combination with an internal combustion engine, means for controlling the rate at which oil is supplied to the engine located near the intake manifold of the engine, means providing an oil reservoir adjacent the engine but located at a higher elevation than the controlling means, a conduit connecting the reservoir and the controlling means whereby there is an effective head of oil urging oil to be discharged into the controlling means, said controlling means comprising means providing a vacuum chamber, a goose neck in the chamber connected to the conduit, said goose neck having a sufficiently small passage therethrough to prevent the flow of oil therethrough under the influence of the head of oil without the assisting effect created by the presence of a vacuum in the chamber, there being an outlet from the chamber leading to the intake manifold and into which the goose neck discharges, and a spring valve controlled air inlet to the chamber providing for the automatic admission of air to the chamber as the vacuum therein tends to increase to cause the vacuum to remain substantially constant and consequently the flow of oil to be substantially constant at all engine speeds.

In testimony whereof I have signed my name to this specification.

WILLIAM H. DILKS.